US009576565B2

(12) United States Patent
Bergman

(10) Patent No.: US 9,576,565 B2
(45) Date of Patent: Feb. 21, 2017

(54) SELECTIVE PITCH EMULATOR FOR ELECTRICAL STRINGED INSTRUMENTS

(71) Applicant: Berggram Development Oy, Helsinki (FI)

(72) Inventor: Jussi Bergman, Helsinki (FI)

(73) Assignee: Berggram Development Oy, Helsinki (FI)

( * ) Notice: Subject to any disclaimer, the term of this patent is extended or adjusted under 35 U.S.C. 154(b) by 0 days.

(21) Appl. No.: 15/030,089

(22) PCT Filed: Oct. 15, 2014

(86) PCT No.: PCT/FI2014/050782
§ 371 (c)(1),
(2) Date: Apr. 18, 2016

(87) PCT Pub. No.: WO2015/055895
PCT Pub. Date: Apr. 23, 2015

(65) Prior Publication Data
US 2016/0267893 A1 Sep. 15, 2016

Related U.S. Application Data

(60) Provisional application No. 61/891,992, filed on Oct. 17, 2013.

(51) Int. Cl.
*G10H 1/18* (2006.01)
*G10H 1/34* (2006.01)
*G10H 3/18* (2006.01)
*G09B 15/00* (2006.01)
*G10H 1/00* (2006.01)
*G10H 1/38* (2006.01)

(52) U.S. Cl.
CPC ............ *G10H 1/342* (2013.01); *G09B 15/003* (2013.01); *G10H 1/0066* (2013.01); *G10H 1/38* (2013.01); *G10H 3/186* (2013.01); *G10H 2210/335* (2013.01); *G10H 2220/096* (2013.01); *G10H 2220/141* (2013.01)

(58) Field of Classification Search
CPC .................................... G10H 1/18; G10H 1/20
USPC .................................................... 84/615, 653
See application file for complete search history.

(56) References Cited

U.S. PATENT DOCUMENTS

| | | | | |
|---|---|---|---|---|
| 6,846,980 B2* | 1/2005 | Okulov | .................. | G10H 1/342 84/613 |
| 7,145,070 B2* | 12/2006 | Barry | ..................... | G10H 1/342 84/723 |
| 7,799,986 B2* | 9/2010 | Ryle | ........................ | G10H 1/053 84/723 |
| 8,269,094 B2* | 9/2012 | Buskies | ............... | G10H 1/0066 84/613 |
| 8,692,101 B2* | 4/2014 | Ryle | ....................... | G10H 1/053 84/622 |

(Continued)

*Primary Examiner* — David Warren
(74) *Attorney, Agent, or Firm* — BelayIP Oy

(57) ABSTRACT

Presented is a method for controlling an electronic stringed instrument. Embodiments of electrical stringed instruments according to the present invention can be actual stringed instruments or virtual representations of stringed instruments. The methods provide a way in which to teach and play electronic stringed instruments which allow a novice musician to focus on a small portion of playing of a stringed instrument while maintaining overall musicality and ability to play the instrument.

13 Claims, 2 Drawing Sheets

(56) References Cited

U.S. PATENT DOCUMENTS

| | | | |
|---|---|---|---|
| 8,759,658 B2* | 6/2014 | Buskies | G10H 1/0066 84/613 |
| 8,835,738 B2* | 9/2014 | Little | G10H 1/38 84/613 |
| 9,082,384 B1* | 7/2015 | Cohen | G09B 15/023 |
| 9,111,518 B2* | 8/2015 | Little | G10H 1/38 |
| 9,208,762 B1* | 12/2015 | Little | G10H 1/38 |
| 2001/0045153 A1* | 11/2001 | Alexander | G10H 3/125 84/609 |
| 2004/0187673 A1* | 9/2004 | Stevenson | G10H 1/02 84/737 |
| 2005/0235813 A1* | 10/2005 | Barry | G10H 1/342 84/723 |
| 2010/0313740 A1* | 12/2010 | Ryle | G10H 1/053 84/735 |
| 2011/0011246 A1* | 1/2011 | Buskies | G10H 1/0066 84/613 |
| 2011/0207513 A1* | 8/2011 | Cross | A63F 13/10 463/7 |
| 2012/0036982 A1* | 2/2012 | Sullivan | G10H 1/383 84/724 |
| 2012/0132057 A1* | 5/2012 | Kristensen | G09B 15/00 84/650 |
| 2012/0160079 A1* | 6/2012 | Little | G10H 1/38 84/613 |
| 2013/0025435 A1* | 1/2013 | Rutledge | G10H 1/38 84/613 |
| 2013/0061735 A1* | 3/2013 | Gehring | G10H 1/383 84/622 |
| 2014/0290466 A1* | 10/2014 | Butera | G10H 1/32 84/609 |
| 2015/0114209 A1* | 4/2015 | Little | G10H 1/38 84/613 |
| 2015/0332661 A1* | 11/2015 | Little | G10H 1/38 84/645 |
| 2016/0125856 A1* | 5/2016 | Bachand | G10G 1/04 84/609 |
| 2016/0163298 A1* | 6/2016 | Butera | G10H 1/342 84/615 |
| 2016/0267893 A1* | 9/2016 | Bergman | G10H 1/342 |

* cited by examiner

SELECTIVE PITCH EMULATOR FOR ELECTRICAL STRINGED INSTRUMENTS

FIELD OF INVENTION

The present invention relates to the field of electrical stringed instruments and the emulation of sound from electrical stringed instruments. Embodiments of electrical stringed instruments according to the present invention can be actual stringed instruments or virtual representations of stringed instruments.

BACKGROUND OF INVENTION

Many people try to learn how to play the guitar, as well as other stringed instrument. Most teaching aids focus on teaching a beginner either how to play entire chords. This can be challenging for many beginners as manipulating their four fingers to cover various positions on six strings is not initially comfortable and there are many things to consider. Additionally, when in full control of the pitch associated with all of the strings it can be very difficult for a beginner to identify problems in how certain fingers are located on the strings and which fingers are correctly located.

For example, if a beginner is learning their first chord of 'C' on a six string guitar they need to use three fingers to depress three strings while allowing three other strings to remain open and undepressed. The location of each finger effects the pitch of that string. If the beginner places all three fingers where they think they should go and strum a chord they will most likely hear that the chord doesn't sound right. However, it will be virtually impossible for them to know exactly which pitch is off and by how much. If a beginner only learns with one finger on one string at a time they may become bored by they may also take longer to learn the whole placement of their fingers for chords.

Therefore, there exists a need to be able to isolate control of pitch of certain strings of an electronic stringed instrument while allowing the remaining strings to be able to be played normally. This way, a player can isolate their learning on a single feature, e.g. one finger placement on one chord, while being able to play music at a high level in order to keep attention and moral high.

SUMMARY OF THE INVENTION

It is an object of the present invention to a method for controlling an electronic stringed instrument.

According to aspects of embodiments of the present invention there are provided methods including selecting a chord, assigning a discreet pitch to fewer than all of the strings of a stringed instrument, and enabling the resultant pitch of at least one unassigned string to vary based on any manipulation of the strings.

Additionally, the method may further comprise the step of emulating a sound based on a manipulation of one or more of the strings. The manipulation may, for example, include at least one of the assigned strings and one of the unassigned strings and wherein the pitch of the assigned strings is not dependent upon the manipulation and the pitch of the unassigned strings is dependent upon the manipulation.

The selected chord can define a discreet pitch for each of a plurality of strings of the electronic stringed instrument. Additionally, the manipulation of the strings having a pitch assigned thereto will result in the discreet pitch assigned to the string.

Thus the pitch of the assigned strings will not vary based on how the user plays enabling the user to focus on the one or more other strings. This way the user can strum along and play full chords, and full songs, while early on in their training while only needing to focus on the finger location of a small subset of the strings. They can also similarly tune their ear to learn what individual strings sound like, what they should sound like and how changing placement of their finger on a certain string, within a chord of other notes, affects the overall sound.

Additionally, according to certain embodiments the emulation of the non-pitch characteristics of sound from the manipulation of any of the strings is based on the manipulation of the string. Thus, the overall musicality can still be left up to the user. E.g. hard strumming sounds louder than soft strumming, taping and other techniques can also come across thus giving the user quite a lot of freedom to play actual music early in the learning stages while not requiring them to focus extensively on the tedious portion of where all the fingers should be placed on the strings.

According to certain embodiments the electronic stringed instrument is a midi guitar having at least five strings, e.g. a standard six string midi guitar or 5 string base guitar.

Additionally, according to certain embodiments the electronic stringed instrument is a virtual representation of a guitar on a touch screen display.

It is an aspect of certain embodiments of the present invention to provide a transitory or non-transitory computer readable medium having stored thereon a set of computer executable instructions for carrying out the method of any of the preceding claims.

DETAILED DESCRIPTION OF EXEMPLARY EMBODIMENTS

Disclosed herein is a method for controlling an electronic stringed instrument. The method can comprise the steps of; selecting a chord, assigning a discreet pitch to fewer than all of a plurality of strings of an electronic stringed instrument and enabling the resultant pitch of at least one unassigned string to vary based on any manipulation of the strings.

Additionally, there is herein disclosed a method for controlling an electronic stringed instrument comprising the steps of; selecting a chord, said chord defining a discreet pitch for each of a plurality of strings of the electronic stringed instrument, assigning the discreet pitch to fewer than all of the plurality of strings, wherein any manipulation of the strings having a pitch assigned thereto will result in said discreet pitch, and enabling the resultant pitch of at least one unassigned string to vary based on any manipulation of the strings.

Methods according to embodiments of the present invention can further include the emulation of a sound based on a manipulation of one or more of the strings. The manipulation of the string may include at least one of the assigned strings and one of the unassigned strings and wherein the pitch of the assigned strings is not dependent upon the manipulation and the pitch of the unassigned strings is dependent upon the manipulation.

Figure 1:
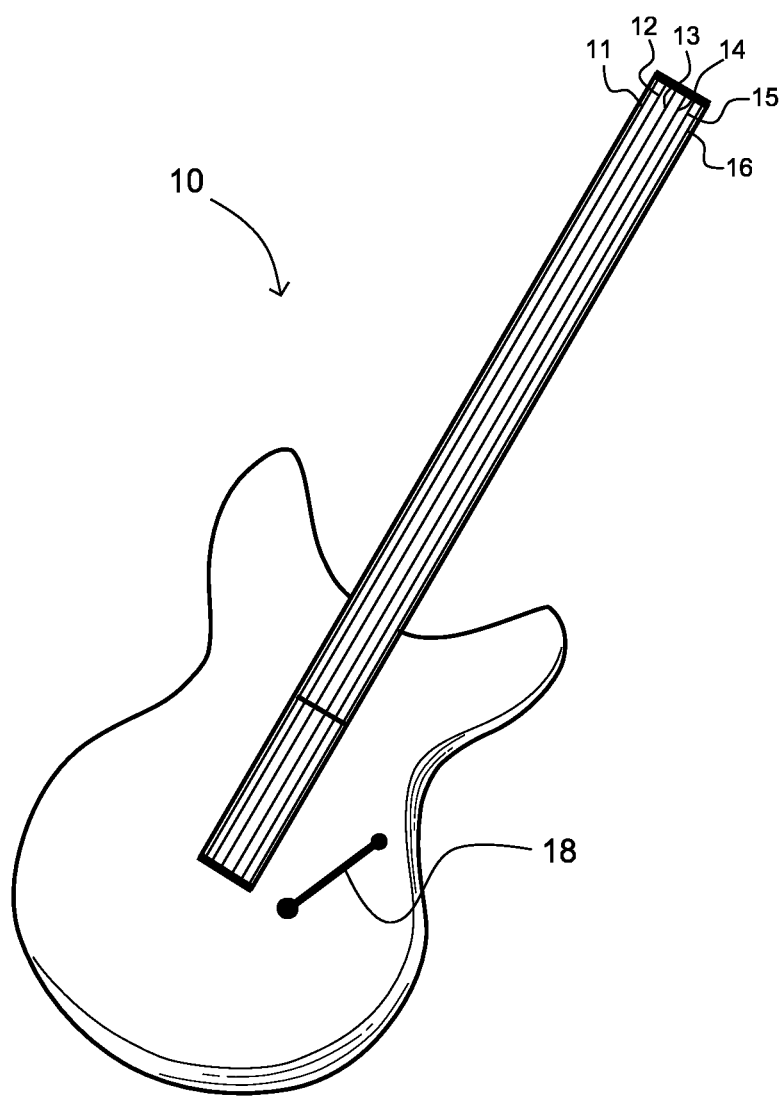
FIG. 1. shows an example of a six-string midi guitar which can be used in accordance with embodiments of the present disclosure.

Methods according to embodiments of the present invention may include those having a physical electronic stringed instrument. For example, the electronic stringed instrument can be a midi guitar having at least five strings. An example of which is shown in FIG. 1. FIG. 1 shows an example of a midi guitar 10 which has six strings, 11, 12, 13, 14 15 and 16. Additionally, the midi guitar may have additional features such as a whammy bar 18. Other physical electronic stringed instruments may be, for example, midi base guitars, electric guitars, electric violins, electric bases, and any other electronic stringed instrument.

Figure 2:
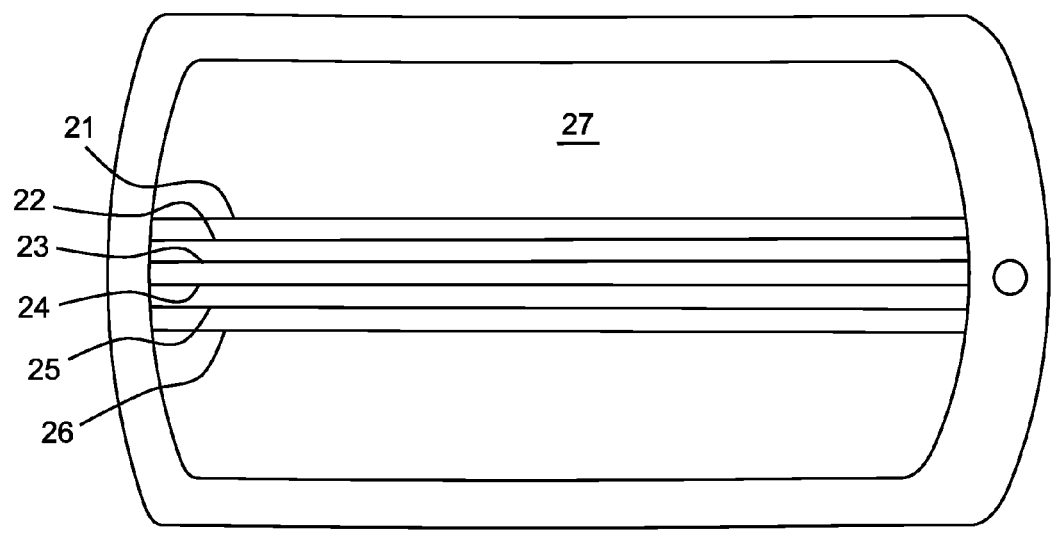
FIG. 2. shows an example of a virtual representation of a six-string guitar on a touch screen apparatus which can be used in accordance with embodiments of the present disclosure.

Methods according to embodiments of the present invention may also include those having a virtual electronic stringed instrument. FIG. 2 is an example of a display of a virtual stringed instrument which is on a tablet device 20 having a touch screen display 27. The tablet device 20 displays a plurality of virtual strings 21, 22, 23, 24, 25 and 26 which correspond to the strings on, for example, a normal 6-string guitar. The virtual representation may similarly be to any type of stringed instrument as discussed above.

Furthermore, the invention is not limited to methods of playing electronic stringed instruments. Certain embodiments of the present invention include the electronic stringed instruments described above which either have internally, coupled thereto or are further coupled to a controller which is capable of carrying out any of the methods disclosed herein.

In the case of a physical electronic stringed instrument, a player typically manipulates a string in various ways. The most common example is by depressing a portion of the string against the finger board or fret on the neck of the instrument. The location and actual pressure of this manipulation typically is what has the major impact on the variation in the pitch from the open pitch. The open pitch is the default pitch of the string based on the actual string characteristics and its tuning.

A second most common example of manipulation of a string is the strumming and/or plucking of the string near or at the body of the instrument. This manipulation of the string has the major impact on the musicality of the resultant pitch.

In an acoustic instrument these manipulations alone are capable of causing an instrument to emit a sound. In the case of an electronic stringed instrument, these manipulations and/or their resulting input and/or vibrations/displacements of the strings are interpreted by a controller. The controller then determines, based on the input and based on other internal criteria, a sound which can then be emulated in some fashion. Examples of emulation include producing the sound through speakers of an electronic device coupled to the controller, recording the sound electronically or otherwise reproducing and/or storing the intended sound or data regarding the intended sound in a meaningful way to a user of the emulation. Other examples of manipulation are picking, plucking, taping, scraping, etc.

According to certain embodiments of methods, the method comprises the steps of determining if there are multiple manipulations of at least one string at a point in time. The multiple manipulations can be, for example, those described above. Manipulations can then be separated in to first and second types of manipulation.

First types can be those where the primary effect of the manipulation of the string is determined to have an impact the pitch of an emulated sound based on that or another manipulation. This, for example, would be the depression of the string towards or against the fingerboard and/or frets on a physical electronic stringed instrument. On a virtual representation of an electronic stringed instrument first type manipulations may be designated in a certain area of the display, e.g. on the right half or left half, or on a designated certain area of the virtual representation, e.g. on a neck portion of a representation showing a neck or in a color coded portion of a string. Additionally, the motion and/or input of the user can determine its type. For example, by holding a finger on a string for a predetermined period of time or longer it may be designated as a first type, e.g. indicating that it is a finger depressing the virtual string.

Second type manipulations can be those where the primary effect of the manipulation of the string is not determined to have an impact on the pitch of an emulated sound based on that or another manipulation. This, for example, would be the picking, strumming, striking or similar manipulation which is primarily meant to actuate, initiate, stop or otherwise control the sound but which is primarily not concerned with the actual pitch being played. In a virtual representation of an electronic stringed instrument the second type manipulations may be similarly designated in a manner as described with regards to first type manipulations. For example, the left side of the screen or an area designated over a virtual representation of a body or sound hole of an instrument may designate second type manipulations. Additionally, the motion and/or input of the user can determine its type. For example, by making a continuous or non-continuous strumming motion or by touching a representation of a string for less than a predetermined amount of time may designate the manipulation as a second type.

Once the manipulations, for some or all of the strings, are separated in to first of second types different manipulations can be selectively used in the emulation of sound. For strings controlled by a controller with an assigned pitch, the controller or an emulator can utilize only second type manipulations when emulating a sound from that string. Therefore, the pitch which is emulated is fixed/assigned and not affected by any or all first type manipulations. However, the user's second type manipulations can still be utilized to affect the musicality of the emulated sound.

Additionally, for strings which are not controlled or assigned a pitch, first or both types of manipulations can be utilized by the controller or emulator to emulate a sound. While typically both types of manipulations would be used, it is also possible that only the first manipulations would be used. In such examples, for example, a second type manipulation can be virtually created/implemented by a program or controller such that a strumming action would happen at a determined time and the pitch of the sound emulated would be based on the determined first type manipulation of the user but any user second type manipulations could be ignored by controller and/or emulator.

Both instructional and entertainment type games can be based, comprise or consist of any of the methods and/or embodiments described herein. For example, an electronic display, e.g. a monitor, touch screen display, tablet device, smart phone, etc., may display and/or present a song and/or video and score or rate a user on the timing of second type manipulations, accuracy/location of first type manipulations or a combination thereof. The second type manipulations may be made, for example, on a virtual representation of an electronic stringed instrument, or portion thereof, on the electronic display, on another electronic display and/or the second type manipulations may be made on a physical electronic stringed instrument connected or in connection with the electronic display.

Furthermore, each of the plurality of strings will typically have associated therewith an open pitch. The open pitch is the pitch when the string is uncontrolled by the present method and/or unmanipulated. The discreet pitch assigned to a sting should differs from said open pitch for each string. For example, a typical six-string guitar has six strings with open pitches of 'E', 'A', 'D', 'G', 'B', and 'E', though variations are possible. However, the discrete pitches assigned to the strings will be substantially different than these open pitches, e.g. the 'A' string pitch will be 'D' an octave higher. However, in the case where a chord includes an open pitch of a string in the chord and that string is to be controlled by the present method or system then the discreet pitch assigned to the string can also be its open pitch. In such examples a first type manipulation of the assigned string with the open pitch assigned would have no affect on the pitch.

The emulation of the non-pitch characteristics of sound from the manipulation of any of the strings is based on the manipulation of the string. However, this is described in more detail above with regards to first and second type manipulations. Generally though, the excitation displacement of any of the plurality of strings has an expected musical effect on the emulation of sound from the manipulation with the exception of pitch for assigned strings. Similarly, additional inputs such as the use of a whammy bar 18 can have their typical effect on the determined pitch to have been normally played, whether that is an assigned pitch or a user controlled pitch.

Selection of a chord can either be based on a user input or can be controlled by a computer program or electronic data. For example, a user input on the electronic stringed instrument or on a connected electronic device, e.g. a touch screen of a mobile device, can select a desired chord to be played. The chord may also be determined by a computer program, such as a game or instructional program and may be implemented with or without interaction from the user. Similarly, if the user is playing along to a song or music video with chord data attached thereto then the chord can be selected based on such data and the timing of the playback of the song.

In addition to selecting an initial chord, a new chord can be selected during usage. The new chord would define a new discreet set of pitches for each of the plurality of strings of the electronic stringed instrument. The new pitches for each string, for example if different from the previous assigned pitch, can be assigned to the strings which were previously assigned with a pitch. Typically, when changing to a new chord the strings which have been previously assigned pitches will continue to be assigned pitches and those not assigned pitches will still remain enabled for the user to affect the pitch.

The number of strings which are assigned pitches can range from none to all. However, typically one or two of the strings will remain free for the user to determine the pitch. In certain examples only one string will have a controlled and assigned pitch.

Based on the present methods, certain examples are possible which provide additional feedback to the user. For example, a method may include the steps of determining if the emulation of the pitch from an unassigned string based on a manipulation of the string, e.g. a first type manipulation, would result in the corresponding pitch for the selected chord for the string. For example, the chord selected will typically have a discreet pitch for each of the available strings including the strings not to be assigned a discreet pitch. The controller can then determine if the user controlled pitch is the same or substantially the same as the pitch desired for the chord.

The method may indicate in an audio, visual, tactile or combination thereof manner an adjustment to be made in the manipulation to result in the correct pitch for the selected chord. For example, if the pitch is slightly low then a coupled electronic display could show a blue color or an upward arrow or a image of a finger making the desired correction in order to achieve the desired effect. In a game embodiment, a score could be displayed or some other display or sound indicating that the emulated sound is different than what is expected based on the users manipulation, e.g. first type manipulation.

Furthermore, a transitory or non-transitory computer readable medium can have stored thereon a set of computer executable instructions for carrying out any of the methods disclosed herein.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for controlling an electronic stringed instrument comprising the steps of;
 selecting a chord, said chord defining a discrete pitch for each of a plurality of strings of the electronic stringed instrument,
 assigning the discrete pitch to fewer than all of the plurality of strings, wherein any manipulation of the strings having a pitch assigned thereto will result in said discrete pitch, and
 enabling the resultant pitch of at least one unassigned string to vary based on any manipulation of the strings.

2. The method according to claim 1, further comprising the step of emulating a sound based on a manipulation of one or more of the strings.

3. The method according to claim 2, wherein the manipulation includes at least one of the assigned strings and one of the unassigned strings and wherein the pitch of the assigned strings is not dependent upon the manipulation and the pitch of the unassigned strings is dependent upon the manipulation.

4. The method according to claim 1, wherein each of the plurality of strings has associated therewith an open pitch when uncontrolled by the present method and/or unmanipulated and said discrete pitch differs from said open pitch for each string.

5. The method according to claim 1, wherein emulation of the non-pitch characteristics of sound from the manipulation of any of the strings is based on the manipulation of the string.

6. The method according to claim 5, wherein the excitation displacement of any of the plurality of strings has an expected musical effect on the emulation of sound from the manipulation with the exception of pitch for assigned strings.

7. The method according to claim 1, wherein the electronic stringed instrument is a midi guitar having at least five strings and wherein at least one string does not have a discrete pitch assigned thereto based on the selected chord.

8. The method according to claim 1, wherein the electronic stringed instrument is a virtual representation of a guitar on a touch screen display, said virtual representation of a guitar having at least five strings and wherein at least one string does not have a discrete pitch assigned thereto based on the selected chord.

9. The method according to claim 1, further comprising the steps of:
 selecting a new chord, said new chord defining new discrete pitches for each of the plurality of strings of the electronic stringed instrument,
 assigning the new discrete pitches to the strings which were previously assigned with a pitch, and
 continuing to enable the resultant pitch of the at least one unassigned string to vary based on any manipulation.

10. The method according to claim 1, wherein at least two of the strings are unassigned.

11. The method according to claim 1, further comprising the steps of;
 determining if the emulation of the pitch from an unassigned string based on a manipulation of the string would result in the corresponding pitch for the selected chord for the string, and
 indicating in an audio, visual, tactile or combination thereof manner an adjustment to be made in the manipulation to result in the correct pitch for the selected chord.

12. The method according to claim 1, further comprising the steps of;
 determining multiple manipulations of at least one string at a point in time,
 separating a first manipulation of the string from the multiple manipulations, wherein the primary effect of the first manipulation of the string is determined to have an impact the pitch of an emulated sound based on that or another manipulation,
 separating a second manipulation of the string from the multiple manipulations, wherein the primary effect of the second manipulation of the string is not determined to have an impact on the pitch of an emulated sound based on that or another manipulation, and
 emulating sound for assigned strings based on the separated second manipulation(s).

13. A non-transitory computer readable medium having stored thereon a set of computer executable instructions for causing an electronic device to emulate sound from an electronic stringed instrument comprising the steps of;
 selecting a chord, said chord defining a discrete pitch for each of a plurality of strings of the electronic stringed instrument,
 assigning the discrete pitch to fewer than all of the plurality of strings, wherein any manipulation of the strings having a pitch assigned thereto will result in said discrete pitch, and
 enabling the resultant pitch of at least one unassigned string to vary based on any manipulation of the strings.

* * * * *